United States Patent [19]
Lebby

[11] Patent Number: 5,517,348
[45] Date of Patent: May 14, 1996

[54] VOLTAGE CONTROLLED TRANSPARENT LAYER FOR A BI-DIRECTINAL DEVICE

[75] Inventor: Michael S. Lebby, Apache Junction, Ariz.

[73] Assignee: Motorola, Schaumburg, Ill.

[21] Appl. No.: 329,931

[22] Filed: Oct. 27, 1994

[51] Int. Cl.$^6$ ................................................ G02B 26/00
[52] U.S. Cl. .................... 359/254; 359/290; 359/291; 359/578
[58] Field of Search ........................ 359/237, 238, 359/240, 290, 245, 295, 578, 579, 291, 292, 254; 385/8, 9

[56] References Cited

U.S. PATENT DOCUMENTS

| | | | |
|---|---|---|---|
| 3,702,722 | 11/1972 | Trambarulo | 359/254 |
| 4,088,991 | 5/1978 | Sachar | 359/292 |
| 4,466,703 | 8/1984 | Nishimoto | 359/254 |
| 4,614,408 | 9/1986 | Mir et al. | 359/323 |
| 4,626,920 | 12/1986 | Glenn | 359/292 |
| 4,714,326 | 12/1987 | Usui et al. | 359/291 |
| 4,857,978 | 8/1989 | Goldburt et al. | 359/292 |
| 4,900,136 | 2/1990 | Goldburt et al. | 359/292 |
| 5,044,736 | 9/1991 | Jaskie et al. | 359/291 |
| 5,067,829 | 11/1991 | Jaskie et al. | |
| 5,099,355 | 3/1992 | Tomita | 359/254 |
| 5,107,533 | 4/1992 | Jaskie | |
| 5,124,834 | 6/1992 | Cusano et al. | 359/292 |

*Primary Examiner*—Martin Lerner
*Attorney, Agent, or Firm*—Gary F. Witting

[57] ABSTRACT

A voltage controlled layer for a bi-directional device (106) is provided. A bi-directional device (106) having a working portion (110) and a surface (103) is operably coupled to substrate. An optically transparent layer (109) of elastic material is placed on the working portion (110) of the bi-directional device (106). A first and a second electrode (116, 117) are attached to the top and bottom surfaces (111, 112) of the optically transparent layer (109) to vary the thickness of the optically transparent layer (109) to accomodate the reception of transmission of light (130, 131) by the bi-directional device (106).

27 Claims, 1 Drawing Sheet

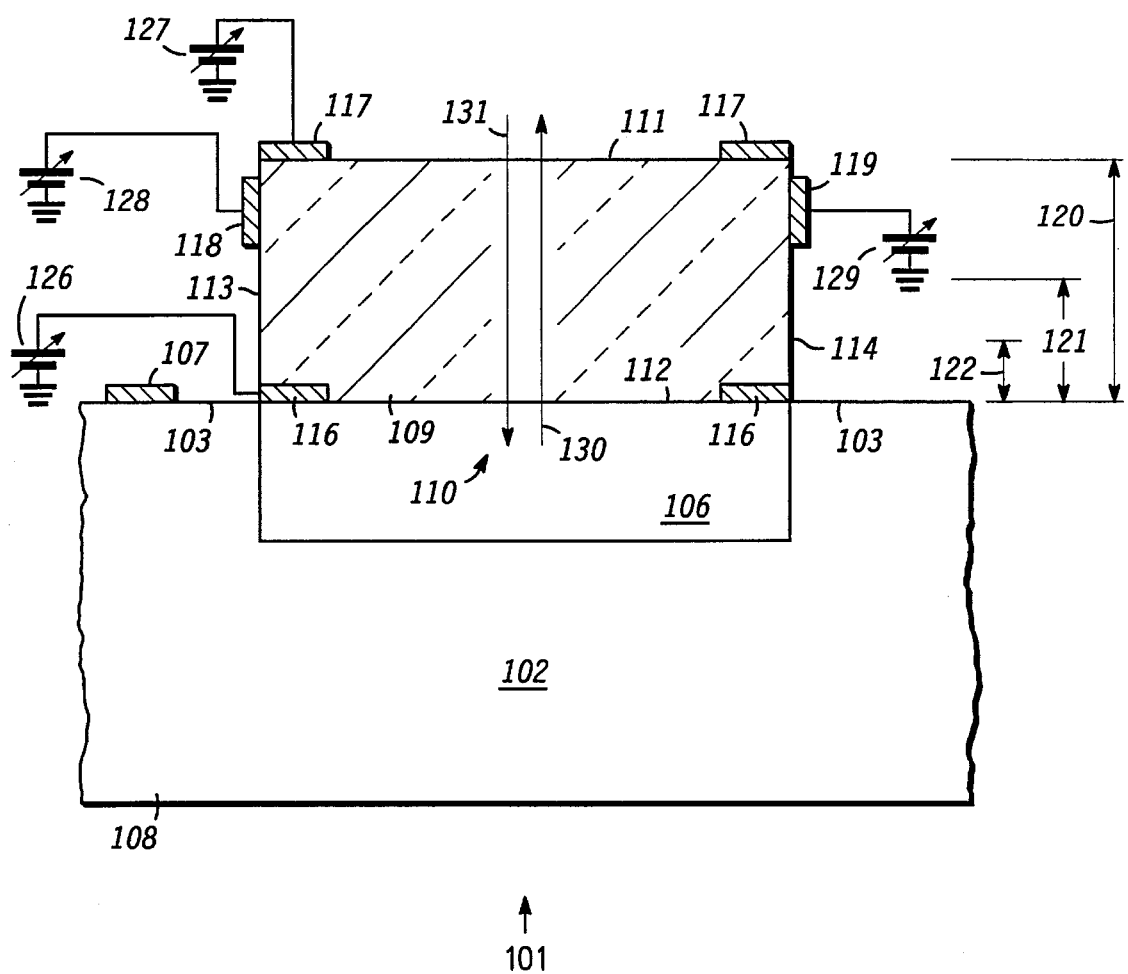

VOLTAGE CONTROLLED TRANSPARENT LAYER FOR A BI-DIRECTINAL DEVICE

FIELD OF THE DISCLOSURE

The present invention relates, in general, to optical devices and, in particular, to bi-directional devices with an optically transparent elastomer.

BACKGROUND OF THE INVENTION

Speed, power, and data transfer requirements, as well as technological advances, have increased use of optics in electronic systems. Integration of optical devices in electronic systems has resulted in an increased demand for efficient, reliable, low cost, small device size, and manufacturable optical devices.

At present, optoelectronic devices that are phototransmitters or photoreceivers are discreet devices, i.e., a phototransmitter only emits light and a photoreceiver only receives light. However, bimodal or bi-directional devices can phototransmit and photoreceive, thus offering an advantage of a single device that can both receive and transmit optical signals. While these bimodal or bi-directional optical devices are known, these devices are too inefficient for use, thus limiting these devices from integration with standard electronic components.

Thus, there is a need for a bi-directional device that has performance levels that are acceptable for both photoreceiving and phototransmitting. Further, the bi-directional device needs to be manufactured in a cost effective manner, as well as having the bi-directional device being reliable.

BRIEF DESCRIPTION OF THE DRAWING

In the sole FIGURE, a simplified section view of a bimodal optoelectronic device is shown.

DETAILED DESCRIPTION OF THE DRAWING

In the sole FIGURE, a simplified section view of a bimodal optoelectronic device 101 is shown that illustrates an embodiment of the present invention. Bimodal optoelectronic device 101 is shown to include several elements, such as a substrate 102 having a surface 103, a bi-directional device 106, an optically transparent layer 109 having surfaces 111 and 112, and electrodes or electrode pairs 116, 117, and 118, 119. Additionally, light beams or optical signals, illustrated by arrows 130 and 131, as well as thicknesses 120, 121, and 122 are also shown. Further, variable voltage sources 126, 127, 128, and 129 coupled to electrodes 116, 117, 118, and 119, respectively, are illustrated.

It should be understood that the FIGURE is a sectional view of bimodal optoelectronic device 101; therefore, bimodal optoelectronic device 101 can extend into and out of the FIGURE, thereby forming any suitable geometric pattern, such as a circle, oval, square, triangle, or the like. Further, it should be understood that for the sake of clarity of illustration of the present invention that no specific size nor relative size of the elements is illustrated by the FIGURE.

Substrate 102 is made of any suitable semiconductor material, such as gallium arsenide, silicon, sapphire, or the like. Typically, substrate 102 is processed to made a variety of layers disposed thereon to make a semiconductor device with its associated regions, such as bi-directional device 106.

Bi-directional device 106 is made by any suitable well-known method in the art. Briefly, with substrate 102 being gallium arsenide, a plurality of alternating layers is disposed on substrate 102 to make a working portion 110 that allows a light emitting p-n junction and a light receiving p-n junction. Generally, when a suitable voltage is applied across the light emitting p-n junction, e.g., through contacts 107 and 108, bi-directional device 106 emits light 130. Alternatively, when light 131 strikes the light receiving p-n junction, a voltage is generated by bi-directional device 106, e.g., through contacts 107 and 108, which is detected by associated semiconductor devices (not shown). Generally, bi-directional device 106 is designed to emit light, as well as to receive light having a wavelength ranging from 780 to 1600 nanometers, with a preferred wavelength ranging from 780 to 990 nanometers.

Optically transparent layer 109 is made from a soft elastic material, such as a polymer, or the like. In a preferred embodiment of the present invention, the material is a polymer of silicone, such as PS2067 ultraviolet curable thin film silicon coating, or PEM25 clean grade liquid silicon elastomer, available from Petrarch Systems of Bristol, Pa.

Typically, surface 111 of optically transparent layer 109 is made to be rigidly planar. For example, if the material from which optically transparent layer 109 is made of is an elastic polymer, rigidity is achieved by curing surface 111 with, any suitable method, such as ultra violet light, temperature cycling, or the like. Alternatively, a thin layer of rigid planar material, such as glass, indium tin oxide (ITO), or the like can be used to coat surface 111 of optically transparent layer 109.

Electrodes 116, 117, 118, and 119 are made of any suitable conductive material, such as a conductive metal, a conductive alloy, a conductive polymer, or the like. For example, with electrodes 116 and 117 being conductive metal, such as aluminum, copper, or ,the like, electrodes 116 and 117 are shaped into ring structures having openings, thereby enabling light 130 and 131 to pass through the openings. In yet another example, with electrodes 116 and 117 comprising the conductive alloy, such as ITO, or the like, electrodes 116 and 117 can extend across the working portion of bi-directional device 106 because ITO is optically transparent, as well as being electrically conductive, thereby enabling light 130 and 131 to pass through the ITO electrode material.

Generally, with electrode 116 positioned below and near the edges of optically transparent layer 109 and with electrode 117 positioned on top of and near the edges of optically transparent layer 109, a voltage or potential is applied to electrodes 116 and 117, thereby charging electrodes 116 and 117. Further, with electrodes 118 and 119 positioned on sides 113 and 114, respectively, of optically transparent layer 109, a voltage or a potential can also be applied to electrodes 118 and 119, thereby charging electrodes 118 and 119. Additionally, while the FIGURE only illustrates electrodes 118 and 119, it should be understood that additional electrodes along sides 113 and 114 are possible.

By applying a voltage or a potential to electrodes 116, 117, 118, and 119, a charge is developed on electrodes 116, 117, 118, and 119 that change thicknesses of optically transparent layer 109 between corresponding electrodes, i.e., electrodes 116 and 117, electrodes 118 and 119. The change in thicknesses of optically transparent layer 109 is in accordance with an amount of charge that is developed from the voltage or the potential applied to electrodes 116, 117, 118, and 119.

As shown in the FIGURE, variable voltage sources 126, 127, 128, and 129 are coupled to electrodes 116, 117, 118 and 119, respectively, thereby allowing any selected voltage to be applied to any of electrodes 116, 117, 118, and 119. By applying different selected voltages to corresponding pairs of electrodes, i.e., electrodes 116 and 117 and electrodes 118 and 119, a charge differential between the corresponding electrodes is developed. The differential charge between the corresponding electrodes either attracts or repulses the corresponding electrodes, thereby changing the thickness of optically transparent layer 109.

For example, by applying a positive voltage to electrode 116 and a negative voltage to electrode 117, a positive charge and a negative charge are developed on electrodes 116 and 117, respectively. Since the charges on electrodes 116 and 117 attract each other, surface 111 of optically transparent layer 109 is drawn toward surface 112 of optically transparent layer 109, thereby thinning optically transparent layer 109. Alternatively, by applying a negative voltage to electrode 116 and a negative voltage to electrode 117, negative charges are developed on electrodes 116 and 117, respectively. Since the charges on electrodes 116 and 117 repel each other, surfaces 111 and 112 of optically transparent layer 109 are repulsed from each other, thereby thickening optically transparent layer 109. Generally, the selected voltage ranges from 1.0 to 24.0 volts, with a preferred voltage range from 3.0 to 15.0 volts, and with a nominal voltage of 5.0 volts. However, it should be understood that variable voltage sources 126, 127, 128, and 129 can be dynamically controlled so as to be set at any desired voltage.

In function, with bi-directional device 106 being at rest, with variable voltage sources 126 and 127 being set to zero volts or zero potential, and with optically transparent layer 109 having a resting thickness of ⅜λ, illustrated by arrow 121, of the desired light wavelength, optically transparent layer 109 remains at thickness 121 or ⅜λ of the desired light wavelength.

With bi-directional device 106 being in the receive mode, variable voltage source 126 provides a positive voltage to electrode 116 and variable voltage source 127 provides a negative voltage to electrode 117, thereby charging electrodes 116 and 117. Since electrodes 116 and 117 are charged oppositely, electrodes 116 and 117 are drawn together, thereby thinning optically transparent layer 109 to ¼λ, illustrated by arrow 122, of the desired light wavelength. With optically transparent layer 109 being ¼λ, optically transparent layer 109 functions as an antireflective coating (ARC). With light 132 being directed toward bi-directional device 106, optically transparent layer 109 (at ¼λ) prevents light 131 from being reflected away from bi-directional device 106, thus not enabling light 131 to escape bi-directional device 106. Further, optically transparent layer 109 (at ¼λ) directs light 131 into bi-directional device 106 to be detected. Since light 131 is not reflected and directed to bi-directional device 106, higher performance is gained from bi-directional device 106.

With bi-directional device 106 being in the transmit mode, variable voltage source 126 provides a positive voltage to electrode 116 and variable voltage source 127 provides a positive voltage to electrode 117, thereby charging electrodes 116 and 117. Since electrodes 116 and 117 are charged the same, electrodes 116 and 117 are repelled from each other, thereby thickening optically transparent layer 109 to ½λ, illustrated by arrow 120, of the desired light wavelength. With optically transparent layer 109 being ½λ, optically transparent layer 109 allows light 130 to pass through optically transparent layer 109. Thus, by providing appropriate charges across electrodes 116, 117, 118, and 119, a change in thickness of optically transparent layer 109 is generated. That is, charging electrodes 116 and 117, either increases or decreases the thickness of optically transparent layer 109, as well as charging electrodes 118 and 119 either decreases or increases the thickness of optically transparent layer 109.

By now it should be appreciated that a novel method and apparatus have been describe for making a bimodal optoelectronic device. The bimodal optoelectronic device with optically transparent layer has a higher performance, thus is suitable for integration with standard electronic components. Additionally the present invention allows for an inexpensive method for making the bimodal optoelectronic device.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A voltage controlled layer for a bi-directional device comprising:

a bi-directional device having a working portion and a surface, the bi-directional device operably coupled to a first contact and a second contact;

an optically transparent layer of elastic material, having a top surface, a bottom surface, and side surface therebetween, the optically transparent layer being placed on the working portion of the bi-directional device;

a first electrode attached to a portion of the bottom surface of the optically transparent layer;

a second electrode attached to a portion of the top surface of the optically transparent layer; and a third electrode attached to a portion of the side surface of the optically transparent layer.

2. A voltage controlled layer for a bi-directional device as claimed in claim 1 wherein the first contact is made of an optically clear electrically conductive material.

3. A voltage controlled layer for a bi-directional device as claimed in claim 2 wherein the optically clear electrically conductive material is indium tin oxide.

4. A voltage controlled layer for a bi-directional device as claimed in claim 1 wherein the first electrode is made of an optically clear electrically conductive material.

5. A voltage controlled layer for a bi-directional device as claimed in claim 4 wherein the optically clear electrically conductive material is indium tin oxide.

6. A voltage controlled layer for a bi-directional device as claimed in claim 1 wherein the second electrode is made of an optically clear electrically conductive material.

7. A voltage controlled layer for a bi-directional device as claimed in claim 6 wherein the optically clear electrically conductive material is indium tin oxide.

8. A voltage controlled layer for a bi-directional device as claimed in claim 1 wherein optically transparent layer of elastic material includes silicon.

9. A voltage controlled layer for a bi-directional device as claimed in claim 1 further including a fourth electrode attached to a portion of the side surface of the optically transparent layer.

10. A voltage controlled layer for a bi-directional device comprising:

a substrate having a surface;

a bi-directional device having a working portion with a surface operably coupled to a first contact and a second contact, the bi-directional device being part of the substrate;

an optically transparent layer of elastic material, having a top surface, a bottom surface, and a first side surface, the optically transparent layer being placed on the working portion of the bi-directional device;

a first electrode attached to a portion of the bottom surface of the optically transparent layer;

a second electrode attached to a portion of the top surface of the optically transparent layer; and a third electrode attached to a portion of the side surface of the optically transparent layer.

11. A voltage controlled layer for a bi-directional device as claimed in claim 10 wherein the first contact is made of an optically clear electrically conductive material.

12. A voltage controlled layer for a bi-directional device as claimed in claim 11 wherein the optically clear electrically conductive material is indium tin oxide.

13. A voltage controlled layer for a bi-directional device as claimed in claim 10 wherein the first electrode is made of an optically clear electrically conductive material.

14. A voltage controlled layer for a bi-directional device as claimed in claim 13 wherein the optically clear electrically conductive material is indium tin oxide, 15. A voltage controlled layer for a bi-directional device as claimed in claim 10 wherein the second electrode is made of an optically clear electrically conductive material.

16. A voltage controlled layer for a bi-directional device as claimed in claim 15 wherein the optically clear electrically conductive material is indium tin oxide.

17. A voltage controlled layer for a bi-directional device as claimed in claim 10 wherein the substrate is gallium arsenide.

18. A voltage controlled layer for a bi-directional device as claimed in claim 10 further including a fourth electrode attached to a portion of the side surface of the optically transparent layer.

19. A method for making a voltage controlled layer for a bi-directional device comprising:

providing a substrate having a surface;

forming a bi-directional device having a working portion with a surface operably coupled to a first contact and a second contact, the bi-directional device being part of the substrate;

disposing an optically transparent layer of elastic material, having a top surface, a bottom surface, and a first surface therebetween, the optically transparent layer being placed on the working portion of the bi-directional device;

positioning a first electrode attached to a portion of the bottom surface of the optically transparent layer;

positioning a second electrode attached to a portion of the top surface of the optically transparent layer; and positioning a third electrode attached to a portion of the first surface therebetween.

20. A method for making a voltage controlled layer for a bi-directional device as claimed in claim 19 where, in the step of positioning the first electrode attached to a bottom surface of the optically transparent layer, the first electrode is made of an optically clear electrically conductive material.

21. A method for making a voltage controlled layer for a bi-directional device as claimed in claim 20 wherein the optically clear electrically conductive material is indium tin oxide.

22. A method for making a voltage controlled layer for a bi-directional device as claimed in claim 19 where, in the step of positioning the second electrode attached to a portion of the top surface of the optically transparent layer, the second electrode is made of an optically clear electrically conductive material.

23. A method for making a voltage controlled layer for a bi-directional device as claimed in claim 22 wherein the optically clear electrically conductive material is indium tin oxide.

24. A method for making a voltage controlled layer for a bi-directional device as claimed in claim 19 where, in the step of positioning the second electrode attached to the portion of the top surface of the optically transparent layer, the second electrode is made of an optically clear electrically conductive material.

25. A method for making a voltage controlled layer for a bi-directional device as claimed in claim 24 wherein the optically clear electrically conductive material is indium tin oxide.

26. A method for making a voltage controlled layer for a bi-directional device as claimed in claim 19 where, in the step of disposing the optically transparent layer of elastic material, the optically transparent layer of elastic material is made from silicon.

27. A method for making a voltage controlled layer for a bi-directional device as claimed in claim 19 further including the step of positioning a third electrode attached to a portion of the first surface therebetween.

* * * * *